United States Patent [19]

Tamura et al.

[11] Patent Number: 4,840,995

[45] Date of Patent: Jun. 20, 1989

[54] AROMATIC POLYESTER/AROMATIC POLYCARBONATE/ALPHA-OLEFIN UNSATURATED CARBOXYLIC ACID REACTION PRODUCT COMPOSITIONS

[75] Inventors: Mitsuhiko Tamura; Masaaki Miyamoto; Kazuo Miyamoto, all of Kitakyushu, Japan

[73] Assignee: Mitsubishi Kasei Corporation, Tokyo, Japan

[21] Appl. No.: 194,893

[22] Filed: May 17, 1988

[30] Foreign Application Priority Data

May 20, 1987 [JP] Japan ................................ 62-122859

[51] Int. Cl.$^4$ ............................................. C08L 69/00
[52] U.S. Cl. .................................... 525/133; 525/147; 525/148
[58] Field of Search ................ 525/133, 148, 147, 439

[56] References Cited

U.S. PATENT DOCUMENTS 4,634,737  1/1987  Liu et al. .............................. 525/146

FOREIGN PATENT DOCUMENTS 3234174  3/1984  Fed. Rep. of Germany.
57-92045  6/1982  Japan.
59-66448  4/1984  Japan.

*Primary Examiner*—Theodore E. Pertilla
*Attorney, Agent, or Firm*—Oblon, Spivak, McClelland, Maier & Neustadt

[57] ABSTRACT

Disclosed herein is a resin composition comprising
 (a) an aromatic polyester,
 (b) an aromatic polycarbonate and
 (c) a reaction product of an α-olefin having a molecular weight of 40 to 2,000 and an unsaturated carboxylic acid or a derivative thereof, the content of said unsaturated carboxylic acid or said derivative thereof in said reaction product being 5 to 70 wt %.

The resin composition according to the present is suitable as electric and electronic parts, automotive parts and other industrial materials.

8 Claims, No Drawings

AROMATIC POLYESTER/AROMATIC POLYCARBONATE/ALPHA-OLEFIN UNSATURATED CARBOXYLIC ACID REACTION PRODUCT COMPOSITIONS

BACKGROUND OF THE INVENTION

The present invention relates to an aromatic polyester/aromatic polycarbonate resin composition which is excellent in bending resistance and solvent resistance.

Generally, aromatic polyesters are thermoplastic resins excellent in properties such as oxidation resistance and solvent resistance, and the molten-molded products thereof are widely used as products having good physical and mechanical properties. These resins, however, have a high crystallinity, so that when they are molded by injection molding, etc., the dimensional stability is poor. In order to remedy this defect, investigation on adding an aromatic polycarbonate which has a good dimensional stability to an aromatic polyester has been made.

On the other hand, aromatic polycarbonate resins, particularly, bisphenol A polycarbonates, are poor in solvent resistance and moldability. Accordingly, attempts to add an aromatic polyester to an aromatic polyester have been made (e.g., Japanese Patent Publication No. 36-14035 (1961)). When an aromatic polycarbonate is mixed with an aromatic polyester, a dimensional stability is provided for the aromatic polyester. The resin composition obtained in this way, however, has insufficient bending resistance and when an injection molded product for a member having a hinge portion is produced from this resin composition, a crack is disadvantageously produced at the hinge portion due to repetition of folding.

Although the solvent resistance and the moldability of an aromatic polycarbonate are improved to some extent by adding an aromatic polyester thereto, but they are still unsatisfactory.

As a result of studies undertaken by the present inventors with a view to eliminating the above-described problems in the prior art, it has been found that a composition obtained by mixing a reaction product of an unsaturated carboxylic acid or a derivative thereof and an α-olefin having a molecular weight of 40 to 2,000 with an aromatic polyester/aromatic polycarbonate resin composition can provide a molded product having not only a good dimensional stability but also improved bending resistance and solvent resistance. The present invention has been achieved on the basis of this finding.

SUMMARY OF THE INVENTION

In an aspect of the present invention, there is provided a resin composition comprising
(a) an aromatic polyester,
(b) an aromatic polycarbonate and
(c) a reaction product of an α-olefin having a molecular weight of 40 to 2,000 and an unsaturated carboxylic acid or a derivative thereof, the content of said unsaturated carboxylic acid or said derivative thereof in said reaction product being 5 to 70 wt %.

DETAILED DESCRIPTION OF THE INVENTION

The aromatic polyester (a) used in the present invention is a polyalkylene terephthalate obtained by the polycondensation of terephthalic acid or a dialkyl ester thereof and an aliphatic glycol, or a copolymer mainly comprising an alkylene terephthalate unit as the constitutional repeating unit. Typical examples of the aromatic polyester (a) are polyethylene terephthalate and polybutylene terephthalate, and polybutylene terephthalate is especially preferred.

As the aliphatic glycol, ethylene glycol, propylene glycol, tetramethylene glycol, hexamethylene glycol, etc. are usable. Also, together with such an aliphatic glycol, a small amount of diol of another kind or polyhydric alcohol having three or more hydroxyl groups may be added. For example, cyclohexanediol, cyclohexanedimethanol, xylylene glycol, 2,2-bis(4-hydroxyphenyl)propane, 2,2-bis(4-hydroxy-3,5-dibromophenyl)propane, 2,2-bis(4-hydroxyethoxyphenyl)propane, 2,2-bis(4-hydroxyethyoxy-3,6-dibromophenyl)propane, glycerin, pentaerythritol or the like may be mixed with an aliphatic glycol in an amount not more than 20 wt % based on the amount of the aliphatic glycol.

With terephthalic acid or a dialkyl ester thereof, a small amount of dibasic acid of another kind or polybasic acid having three or more hydroxyl groups or an alkyl ester thereof may be added. For example, not more than 20 wt % of phthalic acid, isophthalic acid, naphthalenedicarboxylic acid, diphenyldicarboxylic acid, adipic acid, sebatic acid, trimesic acid, trimellitic acid, or an alkyl ester thereof may be mixed with terephthalic acid or a dialkyl ester thereof in an amount not more than 20 wt % based on the amount of terephthalic acid or a dialkyl ester thereof.

The intrinsic viscosity $[\eta]$ of the aromatic polyester (a) used in the present invention, as measured in a 1:1 mixed solvent of tetrachloroethane and phenol at a temperature of 25° C., is 0.6 to 1.2, preferably 0.9 to 1.1.

The aromatic polycarbonate (b) used in the present invention is a polymer obtained by a phosgene method in which various dihydroxydiaryl compounds are reacted with phosgene, or by an ester exchange method in which dihydroxydiaryl compounds are reacted with a carbonic ester such as diphenyl carbonate. The typical example is a polycarbonate resin produced from 2,2-bis(4-hydroxyphenyl)propane (bisphenol A) and phosgene.

As examples of the dihydroxydiaryl compound other than bisphenol A, are exemplified bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxypheny)phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenylpropane; bis(hydroxyaryl)cycloalkanes such as 1,1-bis(4-hydroxyphenyl-3,5-dichlorophenyl)propane; and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

These dihydroxydiaryl compounds are used singly or in the form of a mixture of two kinds or more, they may also be used in combination with hydroquinone, resorcin, 4,4'-dihydroxydiphenyl or the like.

Among the above aromatic polycarbonate, those obtained from bishphenol A are preferred.

The molecular weight of the aromatic polycarbonate used in the present invention is preferably 14,000 to 30,000, more preferably 19,000 to 25,000. A molecular weight higher than 30,000 is unfavorable, because the flow of such an aromatic polycarbonate is poor at molding step. A molecular weight lower than 14,000 is also unfavorable, because the elongation of the molded product obtained from the resin composition is reduced.

As examples of the unsaturated carboxylic acid and the derivative thereof which are used for producing the reaction product (c) of the unsaturated carboxylic acid or the derivative thereof and an α-olefin having a molecular weight of 50 to 2,000, are exemplified unsaturated carboxylic acids such as (meth)acrylic acid, maleic acid, fumaric acid, tetrahydrophthalic acid, itaconic acid, citraconic acid, crotonic acid, isocrotonic acid, and nadic acid ® (endosisbicyclo[2.2.1]-hept-5-en-2,3-dicarboxylic acid) and the derivatives such as halides, amides, imides, acid anhydrides and esters thereof. More precisely, are mentioned maleyl chloride, maleimide, maleic anhydride, citraconic anhydride, monomethyl maleate, acrylic amide, dimethyl maleate, glycidyl maleate, methyl(meth)acrylate, ethyl(meth)acrylate, n-butyl(meth)acrylate, and 2-ethylhexyl(meth)acrylate. Among these, acid anhydrides and esters are preferred, and particularly, maleic anhydride, nadic anhydride ®, ethyl(meth)acrylate, n-butyl(meth)acrylate, 2-ethylhexyl(meth)acrylate are preferred.

The molecular weight of the α-olefin is 40 to 2,000 (3 to 140 carbon atoms), preferably 70 to 1,000 (6 to 70 carbon atoms), more preferably 100 to 600 (8 to 40 carbon atoms). A molecular weight lower than 40 is unfavorable, because the effect of improving the bending resistance is not achieved. A molecular weight higher than 2,000 is also unfavorable because the affinity for an aromatic polyester and an aromatic polycarbonate is lowered, thereby lowering the mechanical strength of the molded product.

As the reaction product of an α-olefin and an unsaturated carboxylic acid or a derivative thereof, a copolymer, a 1:1 adduct and a mixture thereof are mentioned, and those having a weight-average degree of polymerization in the range from 1 to 100 are preferably used. The 1:1 adduct of an α-olefin and an unsaturated carboxylic acid or a derivative thereof, in the present invention, corresponds to the reaction product having the weight-average degree of polymerization of 1. The weight-average degree of polymerization is calculated based on the calibration curve for standard polystyrene according to gel permeation chromatography (G.P.C.). In addition, the molar ratio of an α-olefin to an unsaturated carboxylic acid or a derivative thereof in the reaction product is usually in the range from 1:1 to 1:2.

The copolymerization reaction of an α-olefin and an unsaturated carboxylic acid or a derivative thereof is carried out by solution polymerization method or nonsolvent (bulk) polymerization method in the presence of a radical initiator such as an organic peroxide and an organic perester azo compound in accordance with an ordinary method.

This copolymer is generally an alternating copolymer, and therefore, it is possible to know the number of the functional groups in one molecule by measuring the saponification value of the product.

A 1:1 adduct of an unsaturated carboxylic acid or a derivative thereof and an α-olefin can be produced by equivalent reaction. In order to produce such an adduct, an α-olefin and an unsaturated carboxylic acid or a derivative thereof are heated to 160° to 260° C., preferably 180 to 250° C., more preferably 190° to 230° C. without using any solvent in accordance with an ordinary method. After the reaction is completed, the unreacted α-olefin and unsaturated carboxylic acid or the derivative thereof are removed by distillation under a reduced pressure, thereby obtaining the intended adduct.

As the method for producing the mixture of the above-described copolymer and adduct, for example, a method in which an α-olefin and an unsaturated carboxylic acid or a derivative thereof are subjected to addition reaction under heating to obtain the adduct, and then unreacted α-olefin and an unsaturated carboxylic acid or a derivative thereof are subjected to radical reaction in the presence of a peroxide to obtain the copolymer.

The content of the unsaturated carboxylic acid or the derivative thereof in the reaction product of an α-olefin and an unsaturated carboxylic acid or a derivative thereof is 5 to 70 wt %. A content smaller than 5 wt % is unfavorable, because the number of the functional groups in one molecule is so small as to lower the affinity for an aromatic polyester and an aromatic polycarbonate. A content larger than 70 wt % is also unfavorable, because the resulting molded product is not toughened, therefore, the effect of improving the bending resistance is not achieved. The content is preferably 10 to 50 wt %, more preferably 15 to 30 wt %.

As the alternating copolymer of maleic anhydride and α-olefin, Diacarnas PA4, PA6, PA8, PA124, PA168, PA208 and PA30 (trade name: produced by Mitsubishi Chemical Industries, Ltd.), and as the 1:1 adduct of maleic anhydride and α-olefin, Diacarnas ASA8, ASA124, ASA168, ASA208 and ASA30 (trade name: produced by Mitsubishi Chemical Industries, Ltd.) are exemplified. The saponification values, melting points and molecular weights (GPC) thereof are as follows.

TABLE 1

| | Saponification value | Melting point (°C.) | Molecular weight | Content of unsaturated carboxylic acid (wt %) |
|---|---|---|---|---|
| PA4 | 728 | 153~200 | 3100~5100 | 63 |
| PA6 | 631 | 150~158 | 4900~6900 | 54 |
| PA8 | 534 | 140~144 | 6700~8700 | 47 |
| PA124 | 402 | 125~132 | 12000~13000 | 35 |
| PA168 | 341 | 112~120 | 14000~16000 | 29 |
| PA208 | 318 | 75~85 | 17000~20000 | 23 |
| PA30 | 149 | 72~76 | 9000~10000 | 19 |
| ASA8 | 529 | 10~13 | 210 | 47 |
| ASA124 | 361 | 26~28 | 296 | 35 |
| ASA168 | 318 | 43~45 | 335 | 29 |
| ASA208 | 227 | 52~55 | 510 | 23 |
| ASA30 | 126 | 75~80 | 800 | 19 |

When a composition of the present invention is produced, the three components (a), (b) and (c) may be mixed at any stage before the final molded product is produced. For example, the three components (a), (b) and (c) may be mixed in the form of powder or a pellet, or a blend of the three components may be melted and kneaded and thereafter extruded in the form of a pellet by using an extruder.

The weight ratio of an aromatic polyester (a) and an aromatic polycarbonate (b) is 99:1 to 1:99, preferably 95:5 to 20:80, more preferably 90:10 to 40:60. If the content of the aromatic polycarbonate resin exceeds the range of 99:1 to 1:99, the solvent resistance of the molded product is unfavorably lowered, and some molded products are affected by an organic solvent in the degreasing process. On the other hand, if the content of the aromatic polycarbonate resin is below the range of 99:1 to 1:99, the effect of improving the dimensional stability is not achieved.

The content of reaction product of an unsaturated carboxylic acid or a derivative thereof and an α-olefin in the total composition is 0.01 to 10 wt %, preferably 0.05 to 5 wt %. If the content is higher than 10 wt %, the rigidity of the molded product is unfavorably lowered, thereby making it difficult to use as an injection molded product from the point of view of mechanical strength. On the other hand, if the content is lower than 0.01 wt %, the effect of improving the bending resistance and solvent resistance is not achieved.

The resin composition according to the present invention may contain various known additives such as stabilizers, pigments, fire retardants, mold release agents and inorganic fillers as well as glass fibers.

The resin composition according to the present invention can be molded into products of various shapes such as three-dimensional molded products, various containers, films, sheets and tubes by various molding methods such as injection molding, extrusion molding, blow molding and compression molding. Thus, the resin compositions according to the present are suitable as electric and electronic parts, automotive parts and other industrial materials.

The present invention will be explained in more detail with reference to the following non-limitative examples.

In the examples, the term "%" refer to "wt %".

The bending strength and the bending modulus were measured in accordance with ASTM D790, the Izod impact strength ($\frac{1}{8}$") was measured in accordance with ASTM D256 and the tensile elongation was measured in accordance with ASTM D638.

The bending resistance test was carried out by fixing one end of a molded piece 0.8 mm in thickness, 13 mm in width and 125 mm in length, and bending the other end from +90° C. to −90° C. in repetition until the piece was broken, and the bending resistance was judged by the number of bending operations repeated.

In the chemical resistance test, a test piece was formed in accordance with ASTM D638 and 1% strain was provided for the test piece. After it was exposed to trichlene vapor at 90° C. for 10 min, the piece was dried in a vacuum at 120° C. for 1 hour. The tensile elongation of the thus-treated piece was measured in accordance with ASTM D638 as a standard for the chemical resistance.

EXAMPLES 1 TO 12

Polybutylene terephthalate (hereinunder referred to as "PBT") having an intrinsic viscosity [η] of 1.07, a polycarbonate resin (hereinunder referred to as "PC") having a number-average molecular weight of 21,000 and a reaction product of the acid anhydride and the α-olefin shown in Table 2 were mixed in the weight ratio shown in Table 2. The mixture was melted, kneaded and extruded at 280° C. by a 30 mmΦ biaxial extruder into a pellet. The pellet was dried in a vacuum at 130° C. for 24 hours.

The pellet was injection molded by using a 3.6 oz injection molding machine (IS) 75S type, produced by Toshiba Machine Co., Ltd.) and a molding die for test pieces under the conditions that the temperature of the resin was 280° C., the temperature of the die was 80° C., the injection time was 15 sec and the cooling time was 15 sec.

The physical properties of the thus-obtained molded products are shown in Table 2.

COMPARATIVE EXAMPLES 1 TO 4

Molded products were produced in the same way as in Examples 1 to 12 except that no reaction product of an acid anhydride and an α-olefin was used. The physical properties of the molded product are shown in Table 2.

COMPARATIVE EXAMPLE 5

A molded product was produced in the same way as in Examples 1 to 12 except that a reaction product containing less than 5 wt % of an unsaturated carboxylic acid was used. As the reaction product, a modified ethylene copolymer obtained by the method described below was used. The physical properties of the molded product are shown in Table 2.

(Production of a modified ethylene copolymer)

One hundred parts of ethylene-1-butene copolymer containing 14 mol% of 1-butene having a crystallinity of 20% and a melt index of 3.6, 0.025 part of α,α'-bis-t-butylperoxy-p-diisopropylbenzene dissolved in a small amount of acetone, and 0.5 part of maleic anhydride were blended in a Henschel mixer. The blend was melted, kneaded and extruded into a pellet at 230° C. by using an extruder 40 mm in inner diameter and 28 in L/D. Thus, a modified ethylene copolymer was obtained.

A part of the pellet was grounded and thereafter the unreacted maleic anhydride was extracted with acetone. After press molding the grounded pellet, the maleic anhydride therein was analyzed quantitatively by infrared spectrum. It was found that 0.35% of the maleic anhydride had been graft polymerized.

TABLE 2

| | Composition (wt %) | | | | Tensile test | | | Bending Test | | Izod impact strength $\frac{1}{8}$" (kg·cm/cm) | Bending resistance (number of bending operation) | Chemical resistance (elongation) (%) |
|---|---|---|---|---|---|---|---|---|---|---|---|---|
| | | | Reaction product | | Yield strength (kg/cm²) | Breaking strength (kg/cm²) | Elongation (%) | Strength (kg/cm²) | Modulus (kg/cm²) | | | |
| | PBT | PC | Kind* | Content | | | | | | | | |
| Example | | | | | | | | | | | | |
| 1 | 67.6 | 29.0 | ASA-30 | 3.4 | 560 | 390 | 51 | 820 | 23300 | 4.0 | 7059 | 21 |
| 2 | 68.1 | 29.2 | PA-208 | 2.7 | 530 | 450 | 141 | 890 | 24300 | 4.4 | 3802 | 63 |
| 3 | 68.3 | 29.2 | PA-168 | 2.5 | 574 | 368 | 176 | 890 | 24000 | 4.7 | 1082 | 104 |
| 4 | 58.4 | 38.9 | PA-208 | 2.7 | 585 | 490 | 130 | 980 | 25600 | 4.6 | 2441 | 44 |

TABLE 2-continued

| | Composition (wt %) | | | | Tensile test | | | Bending Test | | Izod impact strength ½" (kg · cm/cm) | Bending resistance (number of bending operation) | Chemical resistance (elongation) (%) |
|---|---|---|---|---|---|---|---|---|---|---|---|---|
| | | | Reaction product | | Yield strength (kg/cm²) | Breaking strength (kg/cm²) | Elongation (%) | Strength (kg/cm²) | Modulus (kg/cm²) | | | |
| | PBT | PC | Kind* | Content | | | | | | | | |
| 5 | 87.5 | 9.7 | PA-208 | 2.7 | 510 | 400 | 182 | 850 | 24000 | 4.2 | 4220 | 66 |
| 6 | 38.9 | 58.4 | PA-208 | 2.7 | 628 | 609 | 120 | 1020 | 26000 | 6.0 | 1021 | 27 |
| 7 | 79.0 | 19.8 | PA-124 | 1.2 | 530 | 480 | >200 | 830 | 24400 | 4.5 | 864 | >200 |
| 8 | 79.2 | 19.8 | PA-8 | 1.0 | 540 | 490 | >200 | 920 | 25900 | 4.4 | 322 | >200 |
| 9 | 79.4 | 19.8 | PA-4 | 0.8 | 550 | 500 | >200 | 910 | 26000 | 4.2 | 313 | >200 |
| 10 | 59.6 | 39.7 | PA-124 | 0.7 | 570 | 470 | >200 | 940 | 27200 | 4.3 | 760 | 195 |
| 11 | 39.7 | 59.6 | PA-124 | 0.7 | 630 | 600 | 195 | 920 | 27000 | 4.2 | 212 | 83 |
| 12 | 19.9 | 79.4 | PA-124 | 0.7 | 640 | 540 | 188 | 910 | 27600 | 4.2 | 198 | 31 |
| Comparative Example | | | | | | | | | | | | |
| 1 | 70 | 30 | — | — | 571 | 515 | >200 | 900 | 24300 | 4.5 | 224 | 22 |
| 2 | 60 | 40 | — | — | 587 | 574 | >200 | 990 | 25800 | 4.7 | 243 | 14 |
| 3 | 90 | 10 | — | — | 523 | 452 | 195 | 830 | 24200 | 4.2 | 845 | 38 |
| 4 | 40 | 60 | — | — | 623 | 643 | 131 | 1050 | 26200 | 6.2 | 174 | 5 |
| 5 | 79.0 | 19.8 | Modified ethylene copolymer | 1.2 | 530 | 470 | >200 | 810 | 23000 | 5.1 | 860 | 24 |

*ASA: 1:1 adduct of maleic anhydride and α-olefin
PA: alternating copolymer of maleic anhydride and α-olefin.
Both ASA and PA are Diacarnas (trade name: produced by Mitsubishi Chemical Industries, Ltd.)

What is claimed is:

1. A resin composition comprising
   (a) an aromatic polyester,
   (b) an aromatic polycarbonate consisting essentially of carbonate units and
   (c) a reaction product of an α-olefin having a molecular weight of 40 to 2,000 and an unsaturated carboxylic acid or a derivative thereof, the content of said unsaturated carboxylic acid or said derivative thereof in said reaction product being 5 to 70 wt %.

2. A resin composition according to claim 1, wherein said reaction product of an α-olefin and an unsaturated carboxylic acid or a derivative thereof is a copolymer, an 1:1 adduct or a mixture thereof.

3. A resin composition according to claim 1, wherein the weight ratio of said aromatic polyester (a) and said aromatic polycarbonate (b) is 99:1 to 1:99.

4. A resin composition according to claim 1, wherein the weight ratio of said aromatic polyester (a) and said aromatic polycarbonate (b) is 99:1 to 80:20.

5. A resin composition according to claim 1, wherein the weight ratio of said aromatic polyester (a) and said aromatic polycarbonate (b) is 99:1 to 40:60.

6. A resin composition according to claim 1, wherein the content of said reaction product (c) in the total composition is 0.01 to 10wt %.

7. A resin composition according to claim 1, wherein the content of said reaction product (c) in the total composition is 0.05 to 5 wt %.

8. A resin composition according to claim 1, wherein said aromatic polyester (a) is polybutylene terephthalate.

* * * * *

UNITED STATES PATENT AND TRADEMARK OFFICE
CERTIFICATE OF CORRECTION

PATENT NO. : 4,840,995

DATED : June 20, 1989

INVENTOR(S) : Tamura et al

It is certified that error appears in the above-identified patent and that said Letters Patent is hereby corrected as shown below:

Column 8, line 31, change "80:20" to --20:80--

Signed and Sealed this

Twenty-first Day of August, 1990

Attest:

HARRY F. MANBECK, JR.

*Attesting Officer*            *Commissioner of Patents and Trademarks*